(12) United States Patent
Snyder et al.

(10) Patent No.: US 10,117,291 B2
(45) Date of Patent: Oct. 30, 2018

(54) WIRELESS MESSAGING ADDRESS SYSTEM AND METHOD

(75) Inventors: Randall Snyder, Campbell, CA (US);
Gerald Hewes, Lexington, MA (US);
Boon Hwang, Redmond, WA (US);
Michael Pirie, Redmond, WA (US);
Eswar Priyadarshan, West Roxbury, MA (US)

(73) Assignee: MOBILE MESSENGER GLOBAL, INC., Los Angeles, CA (US)

( * ) Notice: Subject to any disclaimer, the term of this patent is extended or adjusted under 35 U.S.C. 154(b) by 645 days.

(21) Appl. No.: 10/521,520

(22) PCT Filed: Jul. 18, 2003

(86) PCT No.: PCT/US03/23643
§ 371 (c)(1),
(2), (4) Date: Feb. 23, 2007

(87) PCT Pub. No.: WO2004/010267
PCT Pub. Date: Jan. 29, 2004

(65) Prior Publication Data
US 2008/0119210 A1   May 22, 2008

Related U.S. Application Data

(60) Provisional application No. 60/396,959, filed on Jul. 18, 2002.

(51) Int. Cl.
*H04W 88/18* (2009.01)
*H04L 12/58* (2006.01)

(52) U.S. Cl.
CPC ........... *H04W 88/184* (2013.01); *H04L 51/28* (2013.01); *H04L 51/38* (2013.01)

(58) Field of Classification Search
USPC ......................................................... 455/466
See application file for complete search history.

(56) References Cited

U.S. PATENT DOCUMENTS

| | | |
|---|---|---|
| 5,768,358 A | 6/1998 | Venier et al. |
| 5,974,133 A | 10/1999 | Fleischer, III et al. |

(Continued)

*Primary Examiner* — Steven Kelley
(74) *Attorney, Agent, or Firm* — Arent Fox LLP

(57) ABSTRACT

Service Access Codes (SACs) are special codes that are part of the standard North American Numbering Plan (NANP). Presented herein is a solution for which these special SACs can be used as addresses to wireless data and messaging applications without precluding their traditional use for voice calls. Accordingly, provided herein is an exemplary messaging address system and method for facilitating interaction between mobile subscribers and message-based applications. The system comprises: a communications network; and a message center system coupled to said communications network. The message center system comprises a processor configured to: associate destination addresses with corresponding data network addresses; said destination addresses formatted in accordance with a standard non-geographic numbering and administration plan, receive a mobile-originated message generated by a subscriber wireless device; said mobile-originated message including a destination address, translate said mobile-originated message's destination address into its corresponding data network address, and send said mobile-originated message to said corresponding data network address for receipt by a message-based application. In one embodiment of the invention, the destination address is formatted in accordance with the Numbering Plan (NANP) service access code (SAC) format.

26 Claims, 4 Drawing Sheets

(56) References Cited

U.S. PATENT DOCUMENTS

| | | | |
|---|---|---|---|
| 5,999,525 A | 12/1999 | Krishnaswamy et al. | |
| 6,011,834 A * | 1/2000 | Jeong | 379/88.26 |
| 6,073,165 A | 6/2000 | Narasimhan et al. | |
| 6,175,618 B1 | 1/2001 | Shah et al. | |
| 6,226,373 B1 | 5/2001 | Zhu et al. | |
| 6,275,490 B1 * | 8/2001 | Mattaway et al. | 370/352 |
| 6,611,516 B1 * | 8/2003 | Pirkola et al. | 370/352 |
| 6,678,265 B1 * | 1/2004 | Kung et al. | 370/352 |
| 6,956,831 B1 * | 10/2005 | Mahr | H04L 51/38 370/310 |
| 7,003,307 B1 * | 2/2006 | Kupsh et al. | 455/466 |
| 7,010,303 B2 | 3/2006 | Lewis et al. | 455/445 |
| 7,068,772 B1 * | 6/2006 | Widger et al. | 379/222 |
| 7,079,524 B2 * | 7/2006 | Bantukul et al. | 370/349 |
| 7,116,994 B2 * | 10/2006 | Hatch | 455/466 |
| 7,120,441 B1 * | 10/2006 | Tuomi | H04M 3/54 455/445 |
| 7,164,488 B2 * | 1/2007 | Henry | 358/1.15 |
| 7,366,530 B2 * | 4/2008 | McCann et al. | 455/466 |
| 7,403,788 B2 * | 7/2008 | Trioano | G06Q 30/02 455/41.2 |
| 8,155,677 B2 * | 4/2012 | Hewes | H04W 4/14 455/466 |
| 2002/0016175 A1 * | 2/2002 | Marce | H04M 3/44 455/466 |
| 2002/0019243 A1 * | 2/2002 | Zhang et al. | 455/466 |
| 2002/0173319 A1 * | 11/2002 | Fostick | H04W 88/184 455/466 |
| 2002/0196924 A1 * | 12/2002 | Dahari | 379/220.01 |
| 2004/0014454 A1 * | 1/2004 | Burgess | G06Q 30/02 455/405 |
| 2004/0102201 A1 * | 5/2004 | Levin | G06F 17/2735 455/466 |
| 2004/0142707 A1 * | 7/2004 | Midkiff et al. | 455/466 |
| 2004/0244102 A1 * | 12/2004 | Benzon et al. | 4/420 |
| 2004/0266462 A1 * | 12/2004 | Chava | H04W 88/184 455/466 |
| 2005/0003837 A1 * | 1/2005 | Midkiff | H04W 4/14 455/466 |
| 2005/0020270 A1 * | 1/2005 | Buckley | H04M 1/274516 455/445 |
| 2005/0277430 A1 * | 12/2005 | Meisl | H04L 51/38 455/466 |

\* cited by examiner

WIRELESS MESSAGING ADDRESS SYSTEM AND METHOD

PRIORITY CLAIM

This application claims the benefit of priority of U.S. application No. 60/396,959, filed Jul. 18, 2002, the entire contents of which are incorporated by reference as if set forth at length herein.

FIELD OF THE INVENTION

This invention relates to enabling communications between subscribers and message applications by means of wireless devices. This invention primarily supports the wireless and standardized Short Message Service (SMS); however, it can be applied to any mobile messaging technology.

BACKGROUND OF THE INVENTION

Currently, the most pervasive wireless data technology in the U.S. and Canada is short message services (SMS). SMS is primarily used to support the following types of subscriber data services:
1. Peer-to-peer subscriber text messaging.
2. Notifications, such as voice-mail indications, message waiting indications, etc.
3. Value-added applications and services, such as information services (e.g., stock quotes, weather reports, sports scores, ring tones, graphics, etc.), telemetry and telematics services (e.g., meter reading, shipment tracking, etc.) and mobile marketing and entertainment services (e.g., branded campaigns, promotions, contests, quizzes, etc.).

Each of these data services uses distinctly different addressing schemes:
1. Mobile directory number (MDN) physical (geographical) addresses are typically used for peer-to-peer text messaging and notifications. MDNs are the common mobile phone numbers used for voice calls. In World Zone 1 (primarily the U.S. and Canada), the MDN is required to follow the ten-digit format of the North American Numbering Plan (NANP) which is based on the ITU-T E.164 standard. This format is supported by both GSM networks (as the mobile station integrated services digital network or MSISDN number) and ANSI-41 networks for CDMA and TDMA (as the mobile identification number or MIN).
2. Short code logical addresses are typically used for value-added applications and services. Short codes are numeric addresses (from 1-20 digits, but typically 4-10 digits) used by wireless carriers to enable access to SMS-based value-added applications and services.

Examples of value-added messaging applications are those that allow the subscriber to play games, answer quiz questions, or receive promotional offers.

Wireless carriers can use short codes to deliver text services. A wireless carrier that wants to deploy a pull application will select a sequence of digits that are not a valid NANP number. Their network equipment, usually an SMSC (Short Messaging Service Center) can then be programmed to detect messages sent to these short codes and map them to message services. This solution is very customer friendly and has been used successfully by many wireless carriers. But this technique is not practical for an external entity like a brand. An external entity will want to use the same short code across all wireless carriers to reach their target population. Unfortunately, short codes are not yet standardized and carriers do not use the same numbering plan for short codes.

Another method is to use a wireless mobile device, such as a PCMCIA (Personal Computer Memory Card International Association) card that is connected to a computer device. Instead of having a subscriber receiving the messages, the messages are processed by an automated service. The service is identified by the directory number used by the mobile device, and hence is a regular NANP number. With the recent introduction of interoperability between wireless carriers, the Mobile Originated (MO) message from most wireless carrier will be received by the mobile device. Responses can be sent back using SMTP (Simple Mail Transfer Protocol) or SMPP (Short Message Peer To Peer) directly to the subscriber wireless provider, so effectively the mobile device is only needed for MO messages. But the drawbacks of this technique are many. Mobile devices do not have the scalability required of most campaigns. They usually can only handle a few messages per second. Their reliability is not high as these are consumer grade equipment. Worse, there is currently a lot of latency in the current US interoperability implementation, which impacts the usability of the solution. This is simply not a viable approach for most marketing campaigns.

A network element can also directly receive messages sent to it using wireless carrier SS7 (Signaling System 7) connections. For example, network elements within the PSTN (Public Switched Telecommunications/Telephone Network) SS7 network that combines the functionality of an HLR (Home Location Register), MSC (Mobile Switching Center) and SMSC. It can be configured to receive messages to any valid NANP range assigned to it. This solution is highly scalable. But it has drawbacks. Such equipment, purchased new, can be quite expensive. In addition, it requires that the operator of this system be part of the SS7 network. Few wireless carriers allow third parties to be part of the SS7 network. In addition, this system, being part of the PSTN needs to have the same kind of reliability and operations team required of the PSTN. This means it's expensive to maintain.

In summary, none of the existing methods is practical in markets that have not standardized short codes or achieved subscriber acceptance of the short codes as SACs. As will be described in further detail below, the present invention is a unique and innovative solution that overcomes the aforementioned problems of the prior art.

BACKGROUND OF THE INVENTION—OBJECTS AND ADVANTAGES

Certain advantages of the present invention include, but are not limited to the following:
1. Makes use of non-geographic logical numbers in the North American Numbering Plan. They are designed to be translated by the network into actual physical routable addresses (such as 800- and 900-number services) where the numbers are translated into physical or logical addresses by the data network for routing purposes.
2. For advanced PCS (Personal Communications System), it is appropriate for SAC-based messaging addresses to be translated into addresses for routing. Since PCS is specifically defined and designed for enhanced wireless data services, it is appropriate to translate SAC-based addresses into physical or logical data network addresses. These data network addresses enable routing to a variety of value-added wireless telecommunications and data applications and services—for which PCS is defined.

3. The numbers can be used anywhere in World Zone 1 and by any mobile subscriber to access the same value-added applications or services. All mobile-originated messages require the subscriber to provide an NANP formatted address to send a peer-to-peer message. To send a message to value-added messaging applications, the SAC-based NANP address requires a translation to an address that is universally recognized (e.g., IP addresses). All message centers today support IP connectivity as do the message center gateways. Among the many functions of these gateways is to provide address and protocol translation.

4. SAC-based messaging addresses enable operators to quickly provide a nationwide footprint for value-added messaging applications and services. All telecommunications carriers support SACs as part of the standard NANP. Wireless network operators can provide nationwide coverage of its services so that subscribers can access these services anywhere, even while roaming. External Application Service Providers (ASPs) can also provide nationwide coverage of its services so that subscribers of any wireless network operator can access these services.

5. The use of standard NANP numbers is culturally accepted by mobile subscribers in the U.S. and Canada (and all of World Zone 1). This numbering plan is well recognized and commonly used. It is therefore appropriate to use these numbers as message addresses for value-added network applications. Use of these numbers also prevents market barriers to service acceptance, as everyone is familiar with their use. Use of a non-standard numbering plan can prevent widespread acceptance of valuable wireless telecommunications services.

6. SAC-based numbers are easily supported by all telecommunications carriers in World Zone 1. These numbers enable networks to provide mobile-originated access to services from any and all wireless carriers simultaneously, equitably and unilaterally. They allow for nationwide value-added services to be provided to each and every mobile subscriber from any wireless carrier in the same exact way.

7. The use of SAC-based message addresses can rapidly increase and expedite the growth of mobile message traffic in the U.S. and Canada. Value-added services enable mobile subscribers to originate messages that are received, processed and responded to by an application entity. These value-added services are in great demand. As such, they will serve the dual-purpose of educating the mass market on the ease of use of mobile messaging as well as increasing mass-market acceptance of mobile messaging technology.

8. SAC-based messaging addresses can have the additional impact of increasing the number of voice-calls. Once the mass market is well educated using mobile messaging and they have gained acceptance of the technology, voice traffic can increase. This is due to the nature of peer-to-peer mobile messaging services. A typical response to a mobile message is a voice call, which is considered more valuable to wireless carriers than a simple data message.

9. By using numbers of the format N000-NXX-XXXX as described in the preferred embodiment, the invention can leverage the NANP administration to administer the allocation of number N00-NXX prefixes to different wireless networks and service providers.

10. Deployment of services can be successfully performed without dependence on every wireless network in a numbering plan zone to agree to a standard short code address numbering and administration plan.

Further objects and advantages of this present invention will become apparent from a consideration of the drawings and ensuing description.

SUMMARY OF THE INVENTION

Subscribers can access independent message based application platforms using SACs for routing. The use of SACs enables mobile subscribers from any wireless network in World Zone 1 to originate messages for interaction with value-added message-based applications. These applications can reside within a wireless carrier network or external to the network. The use of SACs has many advantages, such as ubiquitous access, roaming access and culturally accepted address familiarity to subscribers. SACs can also be used by mobile subscribers as the mobile terminating address for messages destined for message-based application systems. As in standard dialable voice calls, SACs require special treatment when used as message addresses.

The use of SACs for message addressing and message routing enables access to application platforms that use SMS as communications transport. Any mobile subscriber can access these applications since the wireless networks and SMS support the address format. This address format is supported by both Global System for Mobile communications (GSM) and American National Standards Institute-41 (ANSI-41) (i.e., Time Division Multiple Access (TDMA) and Code Division Multiple Access (CDMA) networks). The accessible applications could be either within existing wireless carrier networks, or can be provided independent of these wireless networks. The applications can also be operated and maintained by external Application Service Providers (ASPs).

In one embodiment, the format of the SAC will be of the form N000-NXX-XXXX (where N is any number 2-9, and X is any number 0-9) as defined by the Alliance for Telecommunications Industry Solution. These codes have been designated for non-geographic Service Access Codes for a variety of services, such as toll-free (800-numbers) and premium pay numbers (900-numbers). 500-numbers have been defined specifically for wireless Personal Communications Services (PCS). In an alternative embodiment, any NANP number that is designated for non-geographic services can be used, even if they do not match the current N000-N-XX format.

As a purely functional solution, use of SAC-based addresses enables a great deal of freedom for the deployment of value-added mobile messaging applications. These applications can be ubiquitous and seamless, as they are dependent only on data network connectivity (e.g., the Internet), which is essentially ubiquitous today. SAC-based addresses (for example, 500-NXX-X) are especially appropriate for value-added mobile messaging services, since 500-numbers have been defined for PCS.

SAC-based addresses for the use of value-added mobile messaging services does not preclude the use of these numbers for voice calls as well. Mobile Identification Numbers (MINs for ANSI-41) and Mobile Station ISDN Numbers (MSISDNs for GSM) are both MDNs and based on the NANP and wireless subscribers use their unique numbers as addresses for both voice calls and messaging. This has the advantage of enabling applications to be message-based, call-based or a hybrid of both, with no functional changes to existing wireless networks.

This invention applies to any mobile message based services that can use the public telephony addressing scheme, for example SMS, Enhanced Messaging Services (EMS), Multimedia Messaging Services (MMS), Internet Protocol (IP) based technologies using ENUM (RFC 2916), etc.

DETAILED DESCRIPTION OF THE INVENTION

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms, such as, for example, "will," "will not," "shall," "shall not," "must," and "must not," are not meant to limit the scope of the present invention as the embodiments disclosed herein are merely exemplary.

Figure 1:
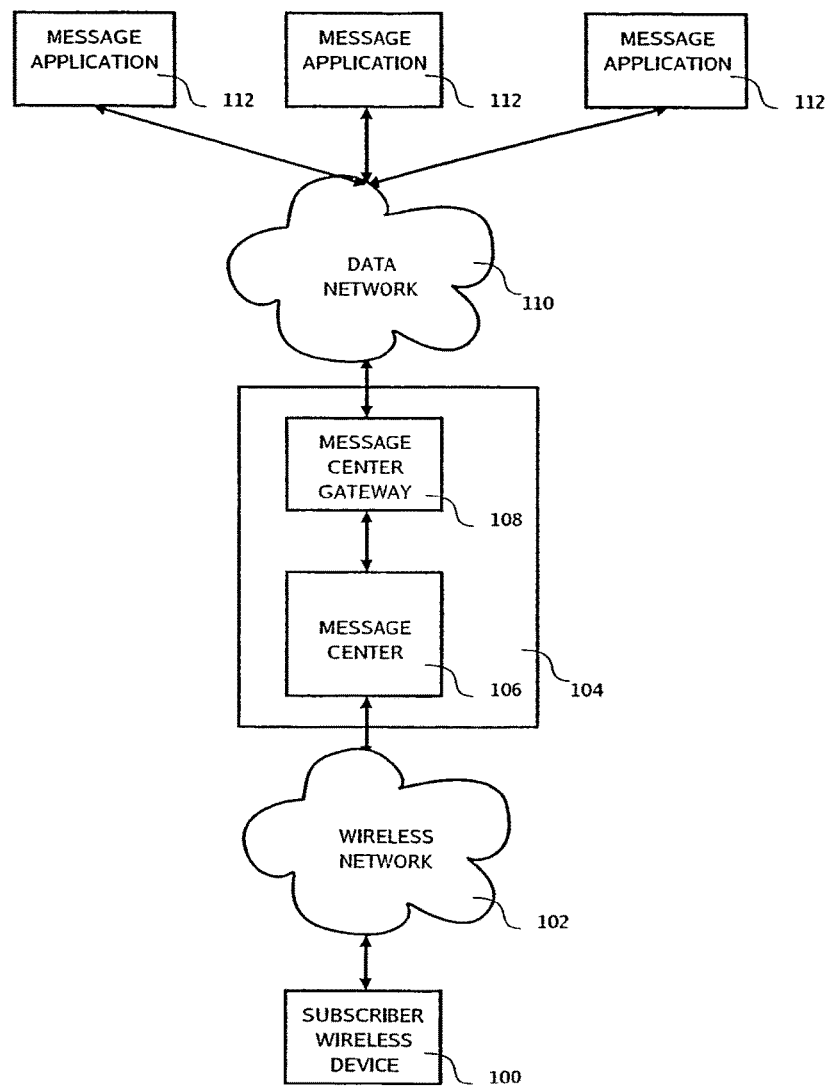
FIG. 1 depicts aspects of an exemplary embodiment of the present invention in accordance with the teachings presented herein.

Turning to FIG. 1 there is shown the basic architecture of one exemplary embodiment of the present invention. The system comprises a subscriber wireless device 100, connected by means of a wireless network 102 to a message center system 104. Said message center system 104 being configured to store and forward messages to their destination. The message center 104 is further connected to a plurality of message applications 112 by means of a data network 110.

There are multiple exemplary embodiments of a message center system. In one exemplary embodiment, the message center system is composed of a message center 106 and a message center gateway 108. The message center maintains routing tables to deliver the message. These routing tables map the logical wireless routing address (for example, 500-NXX-XXX) to the physical or logical data network address (e.g., an internet protocol address or domain name service address) of the message application receiving the message. The message center gateway is configured to queue and deliver the message by means of the data network 110 to the message application 112. In another exemplary embodiment, the message center 110 and the message center gateway 108 are the same component. The presented embodiments for the message center system are illustrative only and not limited to the ones presented. Numerous other embodiments of the message center system 104 are contemplated as falling within the scope of this invention.

Figure 2:
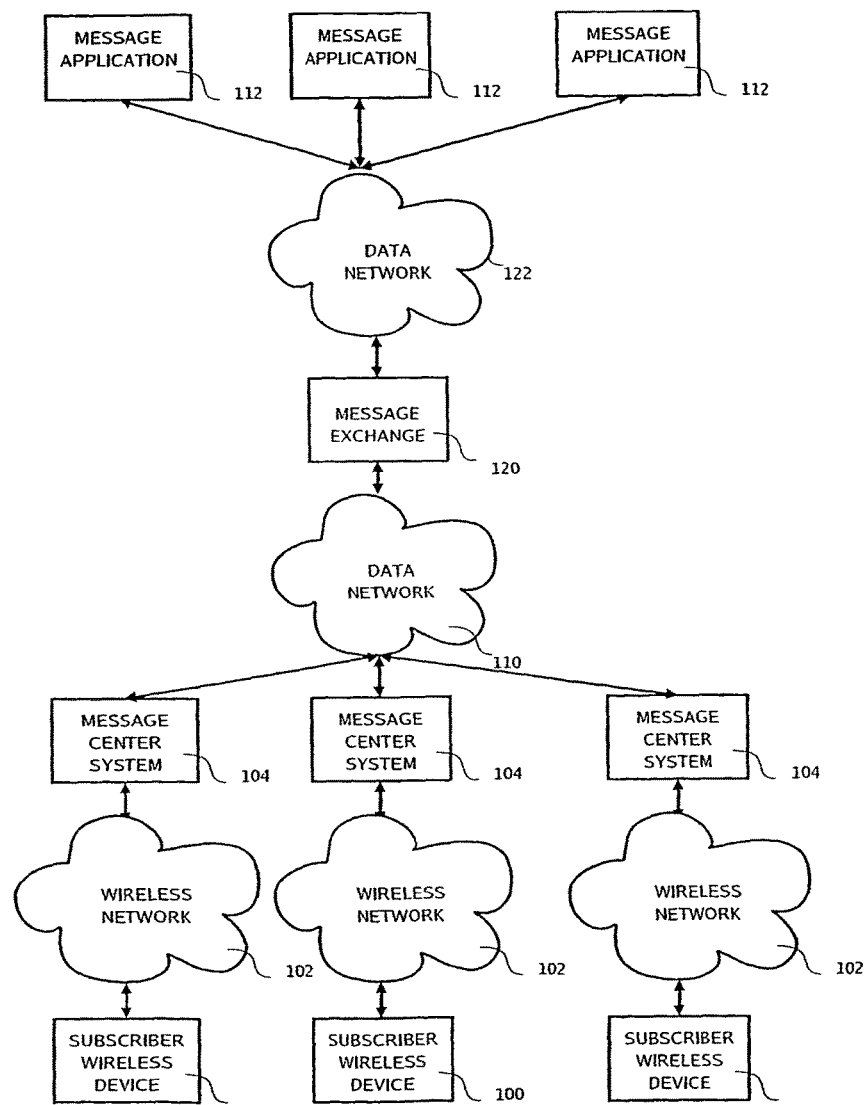
FIG. 2 depicts aspects of an exemplary embodiment of the present invention further comprising a message exchange in accordance with the teachings presented herein.

Turning to FIG. 2 there is shown an exemplar embodiment further comprising a message exchange. The message exchange 120 is connected by means of the data network 110 to a plurality of said message center systems 104, and by means of a data network 122 to the message applications 112. In this embodiment, the message center systems 104 route one or more range of SAC numbers to the message exchange 122, which then further routes the message to each individual message application 112. If the message exchange 120 is operated in an ASP manner, it may significantly cut down on the amount of routing management the wireless provider's message center system 104 needs to be involved with to deliver messages to a plurality of message applications 112. This is especially true considering that in the FIG. 1 embodiment, each carrier in a geography needs to provision each individual message application 112, whereas in the FIG. 2 embodiment, only the ranges, for example a full 10,000 block of number needs to be configured for each carrier, and then each individual message application 112 server only needs to configure its SAC route once with the message exchange 120.

To deploy message applications that make use of this invention, the following exemplary steps are carried out:
1. The value-added application provider obtains an NANP block (e.g., a 10,000 or 1000 number block of numbers from the 500-NXX pool) from NANP Administrator. In an alternative embodiment, the value-added application obtains a number (or series of numbers) from another party that has obtained a block of these numbers from NANPA.
2. The value-added application provider makes the application available on a data network (e.g., the public Internet).
3. The value-added application provider arranges with each wireless carrier to have messages addressed to the number or range of numbers obtained in Step 1 forwarded to the application server described in step 2.

Any protocol that's mutually agreed upon with the carrier can be used. Short Message Peer-to-Peer (SMPP) is one such common protocol.

In an alternative embodiment, thus invention is used in any country that has reserved part of its numbering plan for non-geographic based services using logical numbered addresses.

Figure 3:
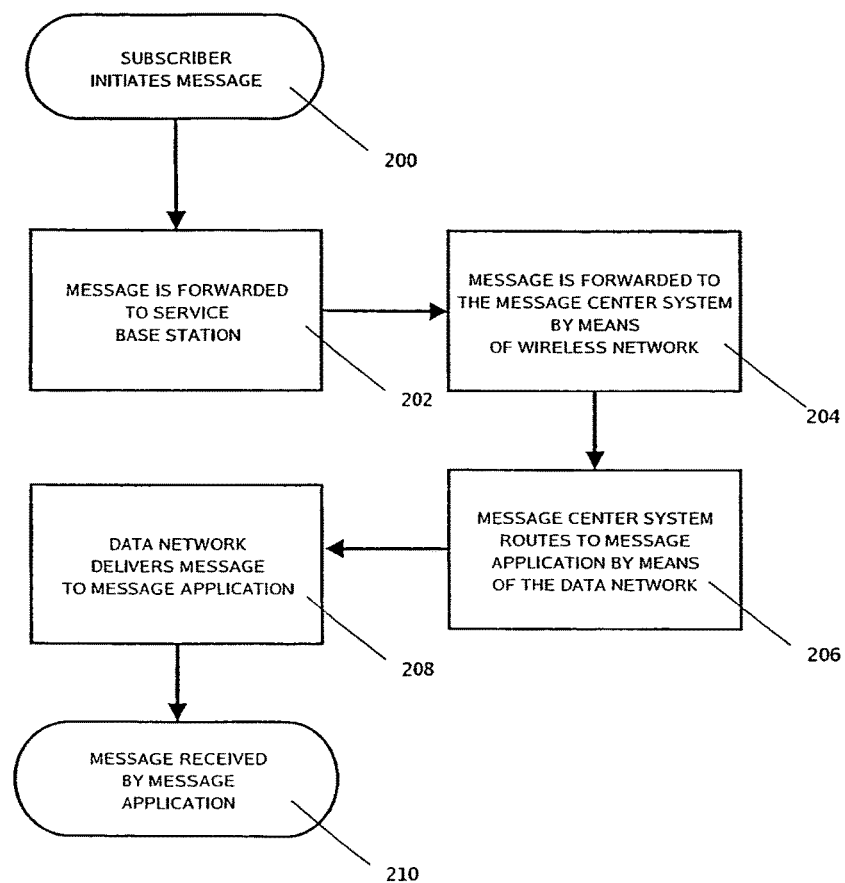
FIGS. 3 & 4 are functional block diagrams of exemplary embodiments of the present invention in accordance with the teachings presented herein.
Figure 4:
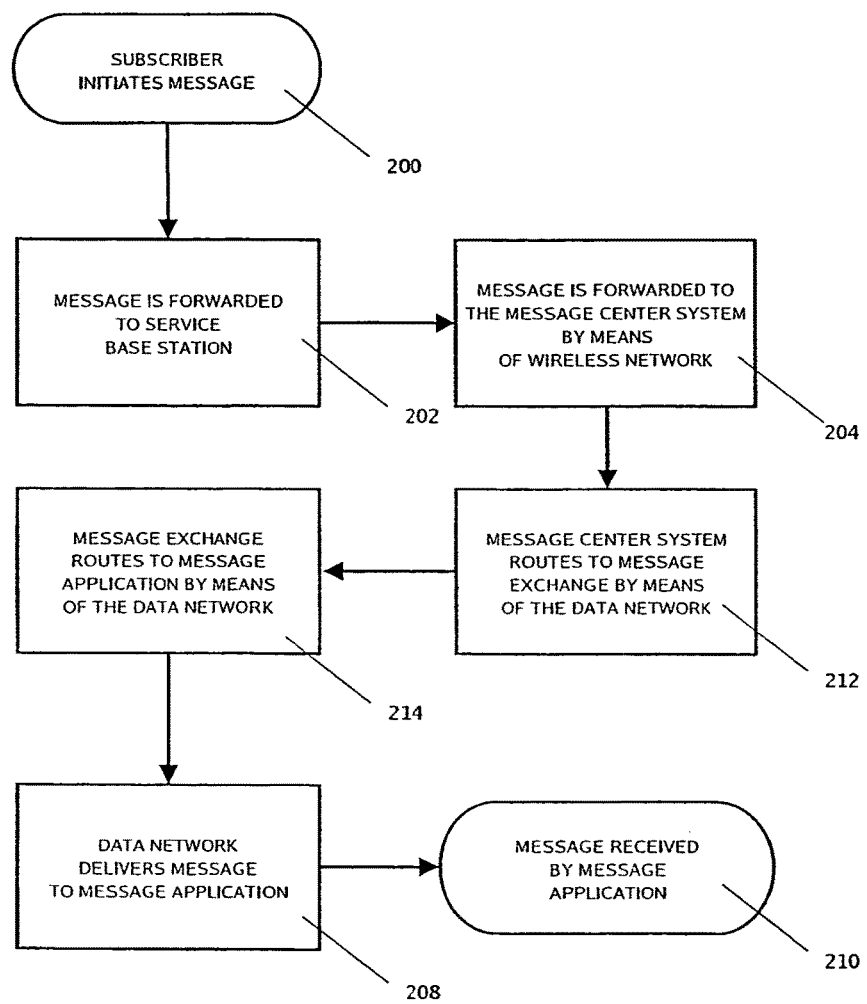

FIGS. 3 & 4 illustrate exemplary operational flows in accordance with the teachings presented herein:

The subscriber initiates a mobile-originated message to a SAC address (for example a 500-NX-XXXX) (step 200). The message is forwarded to the serving base station via the message channel (202). The mobile-originated message is forwarded to the wireless network 102. The message is forwarded directly to the message center system 104 for physical routing to the message destination (204). The message center system 104 maintains routing tables to deliver the message. These routing tables map the logical routing address (for example, 500-NXX-XXXX) to the physical or logical data network address (e.g., an internet protocol address, or a DNS address) of the application receiving the message. The message center system 104 routes the message to the data network 110 based on the translated data network (e.g., IP) address (step 206). The message is encapsulated within lower layers of the protocol and routed as a layer 3 IP packets. The data network 110 (e.g., public Internet or private intranet) routes the message to the destination where the mobile message application(s) 112 resides (step 208). The mobile message application(s) 112 receive(s) the message and processes it accordingly (step 210, FIG. 4). A protocol particularly adapted to the foregoing is SMPP, however other alternative protocols may be used, and even custom developed protocols. As a last step the message is received by the message application 112 (step 210).

Having now described one or more exemplary embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques may be implemented in hardware or software, or a combination of the two. In one embodiment, the techniques are implemented in computer programs executing on programmable computers that each include a processor, a storage medium readable by the processor (including volatile and non-volatile memory and/or storage elements), at least one input device and one or more output devices. Program code is applied to data entered using the input device to perform the functions described and to generate output information. The output information is applied to one or more output devices.

Each program may be implemented in a high level procedural or object oriented programming language to communicate with a computer system, however, the programs can be implemented in assembly or machine language, if desired. In any case, the language may be a compiled or interpreted language.

Each such computer program may be stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

What is claimed is:

1. A messaging address system for facilitating interaction between mobile subscribers and message-based applications servers, the system comprising:
   a communications network; and
   a message center system coupled to the communications network, the message center system comprising:
      a processor configured to:
         obtain from a separate party an entire range of entire destination addresses, and
         associate each of the entire destination addresses from the entire range of destination addresses at more than one wireless carrier and with one or more corresponding data network addresses for a plurality of different message-based applications servers;
         wherein each of the entire destination addresses are formatted in accordance with a standard non-geographic numbering plan,
         wherein the data network addresses are formatted in accordance with an internet protocol address or a domain name service address,
         wherein each entire destination address, from the range of entire destination addresses, is serviced by more than one wireless carrier, and
         wherein each of the entire destination addresses provide mobile originated access to a value added application or value added service associated with the message-based applications servers,
      receive a mobile-originated message generated by a subscriber of a wireless device comprising a destination address entered by the subscriber in a format of XXXXX, where each X is any number 0-9, and XXXXX is an entire unaltered destination address;
         wherein the mobile-originated message includes the entire unaltered destination address falling within the entire range of entire destination addresses and associated, at more than one wireless carrier, with a particular message-based application server formatted in accordance with the standard non-geographic numbering plan for the message-based application server,
      translate the mobile-originated message's entire unaltered destination address, in the format of XXXXX, associated with the particular message-based application server into a corresponding data network address, and
      route the mobile-originated message via a data network using at least the corresponding data network address for receipt by the message-based application server to provide the value added application or the value added service associated with the message-based application, wherein the data network address provides access by any mobile subscriber to the same value added application or value added service.

2. A system as in claim 1, wherein said message center system is further configured to store said mobile-originated message.

3. A system as in claim 1, wherein said communications network comprises a wireless network and a data network and said mobile-originated message having an associated transfer protocol and wherein said system further comprises a wireless-to-data network transfer protocol conversion component associated with said wireless network and said data network, said transfer protocol conversion component for converting said mobile-originated message transfer protocol from said wireless to said data and vice versa.

4. A system as in claim 3, wherein said data network is a network selected from the group consisting of a packet-switched network, circuit-switched network or any combination thereof.

5. A system as in claim 3, wherein said wireless network implements a protocol selected from the group consisting of the Global System for Mobile ("GSM") protocol, Time Division Multiple Access ("TDMA") protocol, Code Division Multiple Access ("CDMA") protocol, other American National Standards Institute-41 ("ANSI-41") protocols, or any combination thereof.

6. A system as in claim 3, wherein said data network implements a protocol selected from the group consisting of the Short Message Service ("SMS") protocol, Enhanced Messaging Services ("EMS") protocol, Multimedia Messaging Services ("MMS") protocol, Internet Protocol ("IP") based technologies using telephone number mapping ("ENUM"), or any combination thereof.

7. A messaging address system for facilitating interaction between mobile subscribers and message-based applications, the system comprising:
- a wireless network,
- a data network;
- a plurality of message-based application servers coupled to the data network; each message-based application server having a data network address associated therewith;
- a subscriber wireless device coupled to the wireless network, the subscriber wireless device for generating a mobile-originated message comprising a destination address entered by a subscriber in a format of XXXXX, where each X is any number 0-9, and XXXXX is an entire unaltered destination address and associated with a particular mobile-based application server;
- the entire destination address formatted in accordance with a standard non-geographic numbering plan, wherein the entire destination address, from a range of entire destination addresses, is serviced by more than one wireless carrier and wherein each of the entire destination addresses provide mobile originated access to a value added application or value added service associated with the message-based applications servers; and
- a message center system coupled to the data network and the wireless network; the message center system comprising:
  - a routing table including the range of entire destination addresses associated with one or more corresponding data network addresses, the data network addresses formatted in accordance with an internet protocol address or a domain name service address,
  - a processor configured to:
    - obtain from a separate party the entire range of entire destination addresses associated at more than one wireless carrier,
    - receive the mobile-originated message comprising the entire unaltered destination address falling within the range of entire destination addresses and associated, at more than one wireless carrier, with a particular message-based application server,
    - access the routing table to translate the mobile-originated message's entire unaltered destination address, in the format of XXXXX, into a corresponding data network address, and
    - route the mobile-originated message via the data network using at least the corresponding data network address for receipt by a message-based application server to provide a value added application or a value added service associated with the message-based application, wherein the data network address provides access by any mobile subscriber to the same value added application or value added service.

8. A system as in claim 7, wherein said message center system is further configured to store said mobile-originated message.

9. A system as in claim 7, wherein said data network is a network selected from the group consisting of a packet-switched network, circuit-switched network or any combination thereof.

10. A system as in claim 7, wherein said wireless network implements a protocol selected from the group consisting of the Global System for Mobile ("GSM") protocol, Time Division Multiple Access ("TDMA") protocol, Code Division Multiple Access ("CDMA") protocol, other American National Standards Institute-41 ("ANSI-41") protocols, or any combination thereof.

11. A system as in claim 7, wherein said data network implements a protocol selected from the group consisting of the Short Message Service ("SMS") protocol, Enhanced Messaging Services ("EMS") protocol, Multimedia Messaging Services ("MMS") protocol, Internet Protocol ("IP") based technologies using telephone number mapping ("ENUM"), or any combination thereof.

12. In a communication network, a method for facilitating interaction between mobile subscribers and message-based applications servers, the method comprising:
- obtain an entire destination address from a separate party that associates at more than one wireless carrier, each of the entire destination addresses from a range of entire destination addresses with one or more corresponding data network addresses for a plurality of different message-based applications servers; each of the entire destination addresses are formatted in accordance with a standard non-geographic numbering plan, and the data network addresses formatted in accordance with an internet protocol address or a domain name service address, wherein each entire destination address from the range of entire destination addresses is serviced by more than one wireless carrier and wherein each of the entire destination addresses provide mobile originated access to a value added application or value added service associated with the message-based applications servers;
- receiving a mobile-originated message generated by a subscriber of a wireless device comprising a destination address entered by the subscriber in a format of XXXXX, where each X is any number 0-9, and XXXXX is an entire unaltered destination address falling within the range of the entire destination addresses obtained from the separate party, and associated, at more than one wireless carrier, with a particular message-based application server;
- translating the mobile-originated message's entire unaltered destination address, in the format of XXXXX, into a corresponding data network address; and
- routing the mobile-originated message via a data network using at least the corresponding data network address for receipt by the message-based application server to provide a value added application or a value added service associated with the message-based application, wherein the data network address provides access by any mobile subscriber to the same value added application or value added service.

13. A method as in claim 12, further comprising the step of:
- at said message center system, storing said mobile-originated message.

14. A method as in claim 12, wherein said communications network comprises a wireless network and a data network and said mobile-originated message having an associated transfer protocol and wherein said method further comprises the steps of:
- providing a wireless-to-data network transfer protocol conversion component associated with said wireless network and said data network and converting said mobile-originated message transfer protocol from said wireless to said data and vice versa.

15. A method as in claim 14, wherein said data network is a network selected from the group consisting of a packet-switched network, circuit-switched network or any combination thereof.

16. A method as in claim 14, wherein said wireless network implements a protocol selected from the group consisting of the Global System for Mobile ("GSM") protocol, Time Division Multiple Access ("TDMA") protocol, Code Division Multiple Access ("CDMA") protocol, other American National Standards Institute-41 ("ANSI-41") protocols, or any combination thereof.

17. A method as in claim 14, wherein said data network implements a protocol selected from the group consisting of the Short Message Service ("SMS") protocol, Enhanced Messaging Services ("EMS") protocol, Multimedia Messaging Services ("MMS") protocol, Internet Protocol ("IP") based technologies using telephone number mapping ("ENUM"), or any combination thereof.

18. The method of claim 12, wherein the data network implements a Short Message Peer-to-Peer (SMPP) protocol.

19. In a communications network, a method for facilitating interaction between mobile subscribers and message-based applications servers, the method comprising:
generating a mobile-originated message using a mobile subscriber device, the mobile-originated message generated by a subscriber of the mobile subscriber device comprising a destination address entered by the subscriber in a format of XXXXX, where each X is any number 0-9, and XXXXX is an entire unaltered destination address; the entire destination address formatted in accordance with a standard non-geographic numbering plan, and data network addresses formatted in accordance with an internet protocol address or a domain name service address, wherein the entire destination address, from a range of entire destination addresses, is serviced by more than one wireless carrier and wherein each of the entire destination addresses from the range of entire destination addresses provide mobile originated access to a value added application or value added service associated with the message-based applications servers; and at a message center system;
obtaining from a separate party that associates at more than one wireless carrier, the range of entire destination addresses;
receiving the mobile-originated message having the entire unaltered destination address obtained from the separate party, and within the range of entire destination addresses stored at a routing table and arranged, at more than one wireless carrier, with one of a plurality of different message-based applications servers;
accessing the routing table including the range of entire destination addresses having associated data network addresses;
translating the mobile-originated message's entire unaltered destination address, in the formal of XXXXX, into a corresponding data network address; and
routing the mobile-originated message via a data network using at least the corresponding data network address for receipt by a message-based application server to provide a value added application or value added service associated with the message-based application, wherein the data network address provides access by any mobile subscriber to the same value added application or value added service.

20. A method as in claim 19, further comprising the step of: at said message center system, storing said mobile-originated message.

21. A method as in claim 19, wherein said communications network comprises a wireless network and a data network and said mobile-originated message having an associated transfer protocol and wherein said method further comprises the steps of: providing a wireless-to-data network transfer protocol conversion component associated with said wireless network and said data network and converting said mobile-originated message transfer protocol from said wireless to said data and vice versa.

22. A method as in claim 21, wherein said data network is a network selected from the group consisting of a packet-switched network, circuit-switched network or any combination thereof.

23. A method as in claim 21, wherein said wireless network implements a protocol selected from the group consisting of the Global System for Mobile ("GSM") protocol, Time Division Multiple Access ("TDMA") protocol, Code Division Multiple Access ("CDMA") protocol, other American National Standards Institute-41 ("ANSI-41") protocols, or any combination thereof.

24. A method as in claim 21, wherein said data network implements a protocol selected from the group consisting of the Short Message Service ("SMS") protocol, Enhanced Messaging Services ("EMS") protocol, Multimedia Messaging Services ("MMS") protocol, Internet Protocol ("IP") based technologies using telephone number mapping ("ENUM"), or any combination thereof.

25. The method as in claim 19, wherein the data network address provides access by any mobile subscriber to the same value added application or value added service, regardless of a wireless carrier of the mobile subscriber.

26. The method as in claim 19, wherein the destination addresses provide concurrent mobile originated access by any wireless carrier to the same value added application or value added service.

* * * * *